United States Patent
Girvin

(10) Patent No.: US 6,382,370 B1
(45) Date of Patent: May 7, 2002

(54) SHOCK ABSORBER WITH AN ADJUSTABLE LOCK-OUT VALUE AND TWO-STAGE FLOW RESTRICTION

(75) Inventor: Robert H. Girvin, Holliston, MA (US)

(73) Assignee: K2 Bike, Inc., Vashon, WA (US)

( * ) Notice: Subject to any disclaimer, the term of this patent is extended or adjusted under 35 U.S.C. 154(b) by 0 days.

(21) Appl. No.: 09/388,830

(22) Filed: Sep. 1, 1999

(51) Int. Cl.⁷ .................................................. F16F 9/34
(52) U.S. Cl. .................... 188/299.1; 188/313; 188/317; 188/319.2; 280/276
(58) Field of Search ................................. 188/312, 313, 188/316, 317, 319.2, 322.22, 299.1; 280/276

(56) References Cited

U.S. PATENT DOCUMENTS

| 3,059,915 A | 10/1962 | Kemelhor |
| 3,240,295 A | 3/1966 | Martinek et al. |
| 3,367,454 A * | 2/1968 | Schenk et al. ................. 188/96 |
| 3,376,031 A | 4/1968 | Lee |

(List continued on next page.)

FOREIGN PATENT DOCUMENTS

| DE | 24 13 833 | 9/1975 |
| DE | 35 00 601 A1 | 7/1986 |
| DE | 38 23 840 A1 | 1/1989 |
| DE | 41 09 180 A1 | 9/1991 |
| DE | 41 03 356 C1 | 6/1992 |
| EP | 0 542 573 A | 5/1993 |
| EP | 0 889 258 A1 | 1/1999 |
| FR | 2 461 851 | 2/1981 |
| FR | 2 465 927 | 3/1981 |
| FR | 2 560 325 | 8/1985 |
| FR | 2 649 465 | 1/1991 |
| GB | 2 223 291 A | 4/1990 |
| JP | 9017038 | 1/1984 |

Primary Examiner—Douglas C. Butler
Assistant Examiner—Benjamin A. Pezzlo
(74) Attorney, Agent, or Firm—Perkins Coie LLP

(57) ABSTRACT

A suspension system with a shock absorber having a manually adjustable lock-out valve and a blow-off valve for controlling damping characteristics suitable for a wide variety of large, medium, and small bumps, and rider induced suspension action, while selectively providing a stiff suspension for increased drive line efficiency. The shock absorber includes a damper containing a non-compressible fluid. A piston dividing the chamber into two portions has a primary channel and a secondary channel. A lock-out valve is coupled to the primary channel and is manually movable from an open position to a closed position. In the closed position, the hydraulic fluid is blocked from flowing through the primary channel to provide stiffened damping characteristics of the damper. In the open position, the hydraulic fluid can flow through the primary channel to provide softened damping characteristics. A blow-off valve is positioned in the chamber's second portion adjacent to the secondary channel to block the secondary channels. The blow-off valve is movable relative to the secondary channel between closed and open position. Movement of the blow-off valve to the open position occurs when a critical hydraulic pressure is reached in the chamber to overcome the biasing member acting against the blow-off valve. A small gap is provided between the blow-off valve and the damper body to provide for smooth hydraulic fluid passage and to achieve supple shock absorber action when the blow-off valve is in the open position.

53 Claims, 8 Drawing Sheets

U.S. PATENT DOCUMENTS

| | | | |
|---|---|---|---|
| 3,827,537 A | | 8/1974 | Haller, Jr. et al. |
| 3,874,635 A | | 4/1975 | Fletcher et al. |
| 3,912,054 A | * | 10/1975 | Fabre et al. ............... 188/282 |
| 4,132,395 A | | 1/1979 | Fox, Jr. |
| 4,164,274 A | | 8/1979 | Schupner |
| 4,802,561 A | | 2/1989 | Knecht et al. |
| 4,961,483 A | | 10/1990 | Yamaoka et al. |
| 4,971,344 A | * | 11/1990 | Turner ....................... 280/276 |
| 5,154,263 A | | 10/1992 | Lizell |
| 5,161,653 A | | 11/1992 | Hare, Sr. |
| 5,201,388 A | | 4/1993 | Malm |
| 5,275,264 A | * | 1/1994 | Isella ........................ 188/299 |
| 5,328,004 A | | 7/1994 | Fannin et al. |
| 5,375,683 A | | 12/1994 | Huang et al. |
| 5,380,026 A | * | 1/1995 | Robinson ................... 280/276 |
| 5,445,401 A | | 8/1995 | Bradbury |
| 5,449,189 A | | 9/1995 | Chen |
| 5,454,452 A | | 10/1995 | Ohlin |
| 5,472,070 A | | 12/1995 | Feigel |
| 5,509,677 A | * | 4/1996 | Bradbury ................... 280/276 |
| 5,522,483 A | | 6/1996 | Koch |
| 5,540,309 A | | 7/1996 | Huang et al. |
| 5,580,075 A | * | 12/1996 | Turner et al. ............... 280/276 |
| 5,593,007 A | | 1/1997 | Siltanen |
| 5,634,653 A | * | 6/1997 | Browning ................... 280/276 |
| 5,653,315 A | | 8/1997 | Ekquist et al. |
| 5,690,195 A | | 11/1997 | Kruckemeyer et al. |
| 5,775,677 A | * | 7/1998 | Englund .................. 267/64.11 |
| 5,803,482 A | | 9/1998 | Kim |
| 5,833,037 A | | 11/1998 | Preukschat |
| 5,848,675 A | * | 12/1998 | Gonzalez ................. 188/319.2 |
| 5,862,895 A | * | 1/1999 | Ricard ....................... 188/289 |
| 5,934,421 A | | 8/1999 | Nakadate et al. |
| 5,996,746 A | * | 12/1999 | Turner et al. ............... 188/269 |
| 6,024,370 A | * | 2/2000 | Baldomero ................. 280/276 |
| 6,026,939 A | * | 2/2000 | Girvin et al. ............ 188/266.7 |
| 6,086,060 A | * | 7/2000 | Berthold .................. 267/64.15 |
| 6,105,987 A | * | 8/2000 | Turner ....................... 280/276 |
| 6,120,049 A | * | 9/2000 | Gonzalez et al. ........... 280/276 |

* cited by examiner

SHOCK ABSORBER WITH AN ADJUSTABLE LOCK-OUT VALUE AND TWO-STAGE FLOW RESTRICTION

FIELD OF THE INVENTION

The present invention relates to suspension systems with shock absorbers for vehicles, such as bicycles and motorcycles, and more particularly, to a shock absorber with internal valves to selectively control the damping characteristics of the shock absorber.

BACKGROUND OF THE INVENTION

Suspension systems have improved the performance and comfort of mountain bicycles. Over rough terrain the suspension system can improve traction and handling by keeping the wheels on the ground. A rider can more easily maintain control at higher speeds and with less effort when the suspension absorbs some of the shock encountered when riding. Ideally, the suspension should react well to both (1) low amplitude, high frequency bumps and (2) high amplitude, low frequency bumps. However, these can be competing requirements for the damping systems in conventional shock absorbers. The suspension system should also provide effective power transfer from the rider to the wheels while in a wide range of riding conditions, including climbing or sprinting.

Higher rebound damping is desirable for high amplitude, low frequency bumps rather than for low amplitude, high frequency bumps. With high frequency, low amplitude bumps, such as may be encountered on a washboard gravel road, minimal damping may be preferable so the shock absorber can quickly recover from a minor impact before the next is encountered. However, with a large bump (such as the size of a curb or a large pot-hole), increased rebound damping aids the rider by keeping the bike from forcefully springing back too quickly, causing loss of traction and control on the rebound.

Some current shock absorbers that include springs and dampers allow the rider to adjust rebound and/or compression damping before a ride. Other air shock absorbers include an on/off switch to disable the shock absorber all together. However, such preadjustment is at best a compromise; the rider must select better damping in one scenario at the expense of the other. A typical off-road mountain bike ride will include small, medium, and large bumps, as well as possibly jumps, drop-offs, and tight descending-to-ascending transitions. If the rider significantly reduces the damping to ride smoothly over high frequency, low amplitude bumps, then the bike may lose traction and control when a large bump is encountered or may "bottom out" the shock absorber. If the rider increases the damping force of the shock absorber, then the system will not recover fast enough to quickly absorb high frequency bumps. Also, the rider likely will be rattled and the bike will lose traction.

Another limitation of many current shock absorbers is evidenced by rider-induced bobbing: suspension movement caused by rider movement during pedaling. Related to this is pedal-induced suspension action: the cyclic forces on the chain pulling the rear swing arm up or down relative to the frame. If the damping in the shock absorber is greater, these influences will not be felt as much by the rider, but the bike's drive line efficiency may be reduced.

Attempts to achieve the competing requirements for a shock absorber include active bypass damping systems. These systems regulate the bypass flow of damping fluid through the damper depending upon the velocity and displacement of the damper's piston relative to the damper body. Such active bypass damping systems are described in detail in co-pending U.S. patent application Ser. Nos. 08/970,820; 08/891,528; and 08/857,125, all of which are hereby incorporated in their entireties herein by reference. These shock absorbers with active bypass damping provide a significant improvement to the shock absorber technology, although the variable damping characteristics are predetermined upon manufacturing, so the rider can not manually adjust the damping characteristics as desired while riding.

Another improved shock absorber is described in detail in co-pending U.S. patent application Ser. No. 09/152,137. This shock absorber provides a variable bypass damping by regulating the flow of damping fluid depending on the velocity and displacement of the shock absorber piston. The variable bypass damping is achieved by mechanical valves that control the bypass flow of fluid relative to the piston depending upon where the piston is during a piston stroke and how fast the piston is moving relative to the piston body. application Ser. No. 09/152,137 is hereby incorporated herein in its entirety by reference. This shock absorber with variable bypass damping provides a significant improvement in the shock absorber art and it utilizes durable, inexpensive mechanical valves for regulation of the damping fluid flow. The shock absorber is pretuned upon manufacturing, however, so it is not manually adjustable by the rider while riding over various terrain conditions. Thus, the rider is not able to manually adjust the stiffness or suppleness of the suspension system while riding.

Suspension systems that react well to both high frequency low amplitude bumps and low frequency/high amplitude bumps provide increased control and traction for the rider because the wheels remain in contact with the ground. While suspension systems are effective at absorbing energy when encountering bumps, the suspension systems also absorb energy from the rider, such as when the rider is pedaling hard while climbing or sprinting. Such absorption of the rider's energy decreases the efficiency of power transfer from the rider to the ground. Accordingly, suspended bikes provide good control for the rider. Unsuspended bicycles, known as stiff tail bikes, have very efficient power transfer from the rider, but provide less control for the rider. Effective suspension systems, thus, should provide a wide range of suspension action for control, while being able to provide efficient power transfer from the rider, particularly when needed for climbing or sprinting.

SUMMARY OF THE INVENTION

When riding a bicycle with a suspension system, it is desirable to have a high performance shock absorber that dampens riding loads while also allowing for highly efficient power transfer from the rider, such as when climbing or sprinting. The action of rear suspension systems can sometimes reduce the efficiency of power transfer from the rider to the ground. The present invention addresses the suspension challenges experienced by the prior art and solves drawbacks experienced by the prior art in selectively accommodating high frequency/low amplitude bumps, low frequency/high amplitude bumps, and rider induced suspension action. The present invention also provides a suspension that is manually adjustable to significantly stiffen the suspension system for increased drive line efficiency. The present invention can be applied to most suspension configurations as it addresses the challenges with a unique adjustable and active damping shock absorber.

The shock absorber includes a lock-out valve that can be adjusted by the rider during use to effectively absorb large bumps, small bumps, and rider-induced suspension bounce, while being activatable to lock out the shock absorber and stiffen the suspension system when needed for increased power efficiency. The shock absorber provides for high performance shock absorption by manual activation of the lock-out valve to create a significantly higher shock compression force, thereby effectively locking shock travel when desired, for example, to increase the bike's drive line efficiency while climbing or sprinting. The shock absorber also includes a blow-off valve with tuned damping characteristics for two-stage flow restriction in the shock absorber.

The shock absorber includes a damper having a chamber containing a substantially non-compressible fluid, and a piston in the chamber that divides the chamber into first and second portions. The piston is movable relative to the chamber while sealably engaging the chamber. The piston has a primary bypass channel in fluid communication with the chamber's first and second portions to allow the non-compressible fluid to selectively move between the chamber's first and second portions when the piston moves relative to the chamber. The lock-out valve is coupled to the bypass channel and is manually moveable from an open position to a closed position. In the closed position, the fluid is blocked from flowing through the primary bypass channel, thereby providing a first damping characteristic of the damper. In the open position, the fluid can flow through the primary bypass channel, thereby providing a second damping characteristic of the damper. Accordingly, the manually activatable lock-out valve allows a rider to actively adjust the damping characteristics of the damper while riding.

In one embodiment, the damper has a manually adjustable actuator connected to the lock-out valve. The actuator is moveable by the rider to cause the lock-out valve to move from the open position to the closed position. The non-compressible fluid is pressurized and acts on the lock-out valve to move it back to the open position when the actuator is released.

In one embodiment, the shock absorber has compression flow channels in fluid communication with the chamber's first and second portions. A flow regulating valve or blow-off valve is positioned adjacent to the compression flow channels. The blow-off valve is moveable relative to the compression flow channels between closed and open positions. In the closed position, the blow-off valve prevents the non-compressible fluid from flowing through the compression flow channels to the chamber's second portion. Thus, the damper has stiffened characteristics when the blow-off valve is in the closed position. In the open position, the blow-off valve is spaced away from the compression flow channels and allows the non-compressible fluid to flow through the compression flow channels to the chamber's second portion. Thus, the damper has a softened characteristic when the blow-off valve is in the open position.

In one embodiment the compression flow channels extend through the piston, and the blow-off valve is adjacent to the piston. The blow-off valve provides a two-stage flow restriction through the piston. The blow-off valve is configured to resist piston motion caused by rider pedaling forces, yet allow piston motion when the suspension system is subjected to larger bump forces sufficient to force the blow-off valve open. The blow-off valve is pre-loaded toward the closed position by a biasing member, The biasing member holds the blow-off valve in the closed position and resists rider-induced forces, such as from pedaling action, until the fluid's pressure reaches a critical pressure that overcomes the pre-loading of the biasing member. At or above the critical pressure, the non-compressible fluid moves the blow-off valve from the closed position to the open position and flows through the compression flow channels.

The blow-off valve is sized to be spaced slightly apart from the side walls of the chamber to provide a small annulus through which the non-compressible fluid flows when the blow-off valve is in the open position. The blow-off valve provides a large surface area against which the hydraulic fluid can press to hold the blow-off valve in the open position. The small annulus provides a reduced flow passageway past the blow-off valve when in the open position for smooth fluid flow and smooth pressure release that prevents pressure equilibrium from occurring too quickly. Thus, the blow-off valve enables the damper to maintain a supple damping characteristic as the blow-off valve moves between the open and closed positions.

In one embodiment of the invention, the shock absorber is incorporated in a suspension system having first and second vehicle structures moveable relative to each other. The shock absorber's first chamber is coupled to the first vehicle structure, and the second chamber is coupled to the second vehicle structure. The second chamber has a compressible member therein that provides a biasing force in the shock absorber. The first chamber is slidably disposed in the second chamber and is moveable relative to the second chamber when the first vehicle structure moves relative to the second vehicle structure. Movement of the first chamber into the second chamber compresses the compressible member to increase the biasing force. The shock absorber has a piston assembly moveable relative to the first chamber as the first and second chambers move relative to each other. In one embodiment, the piston includes the manually activatable lock-out valve and the blow-off valve. The suspension system provides for an adjustable damping characteristics to stiffen or soften the shock absorber's damping characteristics during use as desired by the user.

BRIEF DESCRIPTION OF THE DRAWINGS

The foregoing aspects and many attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The suspension system with the shock absorber of the present invention may be employed in a multitude of different applications. However, the system disclosed and described herein is particularly well suited to vehicles, especially bicycles of the mountain bike variety. The system is also well suited to motorcycle suspension systems, especially off-road motorcycles. Mountain bikes will be referred to throughout this detailed description. However, it should be understood that mountain bikes are simply the preferred application and the same concepts and basic constructions can be used in other shock absorber applications.

The suspension system with the present shock absorber is particularly advantageous with mountain bikes since large, medium, and small bumps, drops, and shock-producing surfaces are encountered during mountain bike riding. The shock absorber is adapted to effectively absorb large, medium, and small bumps to provide enhanced control, and also to be manually adjustable to lock out the shock absorber and stiffen the suspension system when desired, such as for climbing or sprinting. Often, low amplitude bumps occur at a high frequency. For example, a washboard gravel road may have numerous, close together small bumps that create high frequency, low amplitude shocks at the wheels of the bicycle. Conversely, high amplitude bumps have a relatively lower frequency, since the size of the bump itself dictates that the bumps be somewhat spaced apart. A street curb is an example of a high amplitude, low frequency bump. Numerous rocks, bumps, roots, and other obstacles are encountered when mountain biking off-road. The shock absorber of the present invention is designed to handle all these bumps. Further, the shock absorber is also adjustable to reduce undesirable cycling effects such as pogo action or bobbing, as well as chain-induced suspension action. The suspension system, thus, gives the rider a high degree of control, while easily being manually adjustable to stiffen the bike's rear end and increase the bike's drive line efficiency. The shock absorber also includes a blow-off valve that allows for some action when the shock absorber is locked out and a large bump is encountered, thereby providing increased control for the rider.

Figure 1:
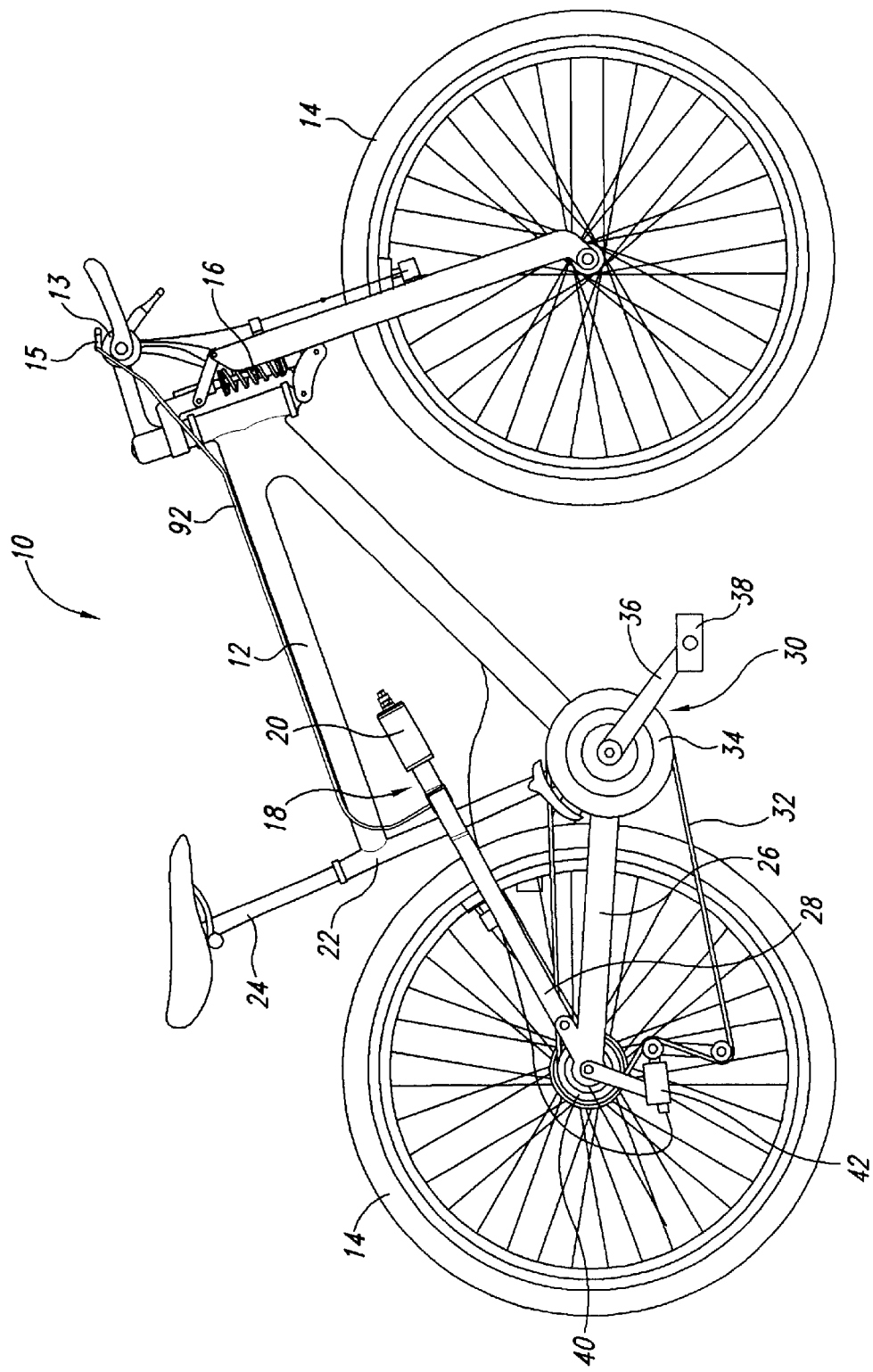
FIG. 1 is a side elevation view of a bicycle having an adjustable suspension system with a shock absorber according to an embodiment of the present invention.

FIG. 1 illustrates a mountain bike 10 having a frame 12, handle bars 13, wheels 14, a front suspension system 16, and a rear suspension 18 with a shock absorber 20 in accordance with one embodiment of the present invention. The frame 12 includes a seat tube 22 that receives a seat 24 therein. The seat tube 22 is pivotally connected to one part of the shock absorber 20. The rear suspension 18 includes a rear swing arm 26 pivotally attached to the bottom of the seat tube 22 and connected to the rear wheel 14. Shock stays 28 extend upwardly from the rearward end of the swing arm 26 and connect to a second portion of the shock absorber 20. Thus, when the swing arm 26 pivots upwardly, the shock stays 28 move relative to the seat tube 22 and cause the shock absorber 20 to compress so that the rear wheel can move relative to the frame 12 to absorb and dampen shock. The shock absorber 20 has a lock-out valve (discussed in detail below) manually adjustable via a cable 92 extending from the shock absorber to a switch mechanism 15 on the handle bars 13. The shock absorber 20 of the illustrated embodiment is a pull shock absorber, although alternative rear suspension systems can be employed with the shock absorber. The shock absorber 20 in accordance with this invention can also be used on front suspension systems to increase the bike's climbing and sprinting performance and selectively avoiding rider-induced suspension action. Other systems may include unified rear triangles, unified swing arm and chain stay arrangements, or linkage assemblies. Leverage ratios on the shock absorber may change, for example, while still using the same core damping technology.

The mountain bike 10 also includes a drive system 30 having a chain 32 extending around a chain ring 34 attached to the frame 12. The cranks 36 are secured on the inner ends to the chain rings 34, and the pedals 38 are secured to the outer ends of the cranks. Rear sprockets 40 are connected to the rear wheel 14, and a rear derailleur 42 is provided for shifting the chain 32 from one sprocket to another. The drive system 30 is relevant to the shock absorption, particularly in the arrangement illustrated in FIG. 1, since the upper drive line of the chain is spaced apart from the swing arm pivot such that as force is applied to the pedals 38, the chain 32 slightly pulls the rear suspension 18 upwardly and applies a compression force on the suspension system. If the rider does not have smooth pedaling action, then cyclic forces on the chain 32 add to the upward forces on the suspension system and may cause cyclic bobbing of the rear suspension 18 as the mountain bike 10 is ridden. As will be explained in more detail below, the lock-out damping system of the shock absorber 20 can eliminate such chain-induced suspension action, and eliminate the suspension action due to the rider's body motion while pumping the pedals. Accordingly, the rider's pumping action is transferred to the wheels as power and not absorbed by the suspension system.

As best seen in FIGS. 2–7, the details of the construction of the shock absorber 20 will now be discussed. While the shock absorber 20 refers to the pull shock absorber used with the rear suspension system 18 illustrated in FIG. 1, other shock absorbers can be employed in the suspension systems.

Figure 2:
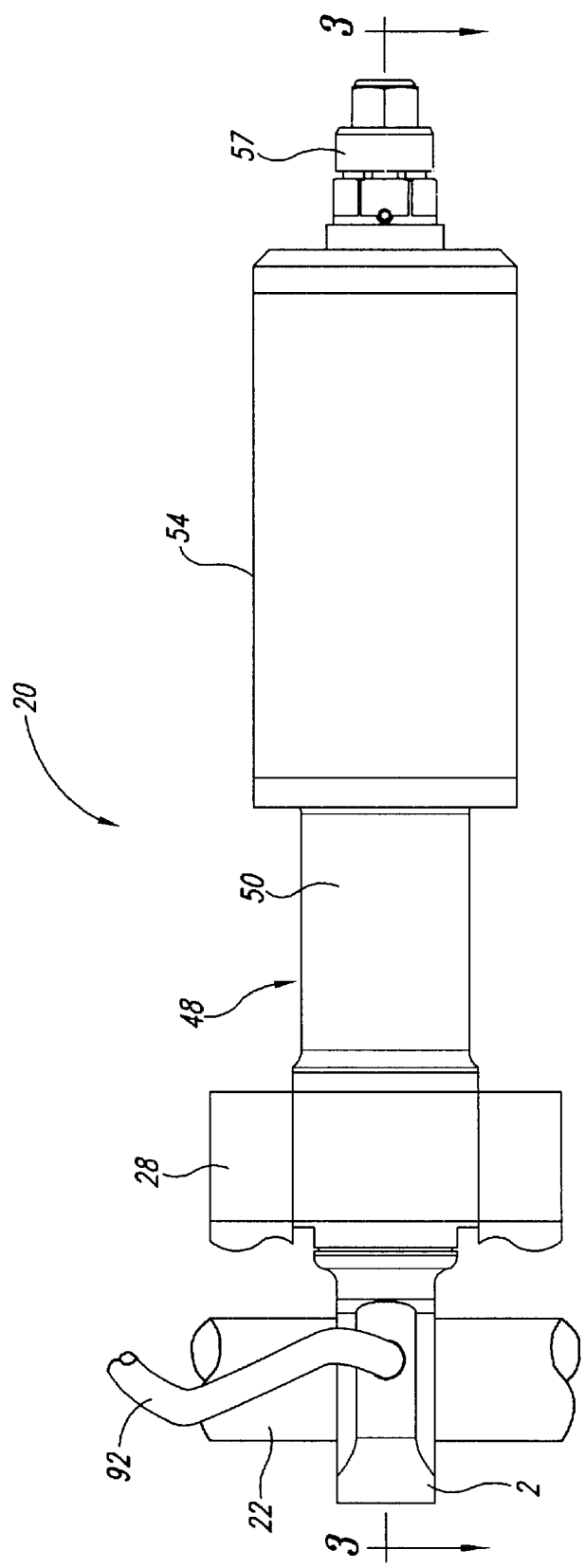
FIG. 2 is an enlarged side elevation view of the shock absorber of FIG. 1.
Figure 3:
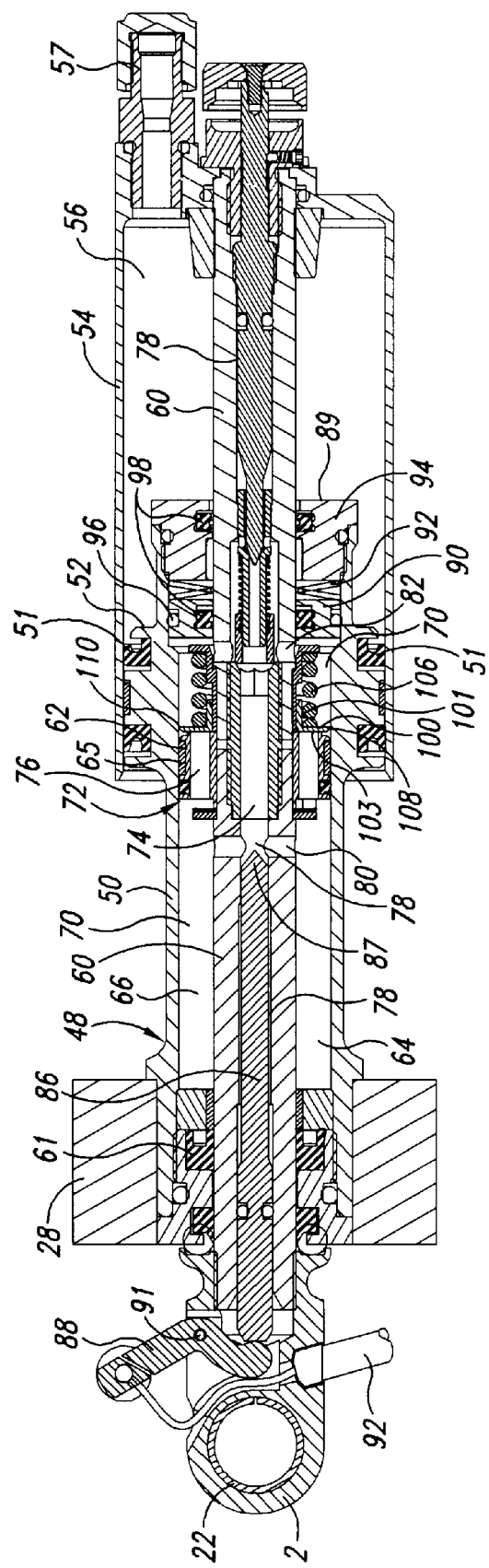
FIG. 3 is a cross-sectional view taken substantially along line 3—3 of FIG. 2, the shock absorber being shown in an initial uncompressed position, with a lock-out valve shown in an open position and a blow-off valve in a closed position.
Figure 4:
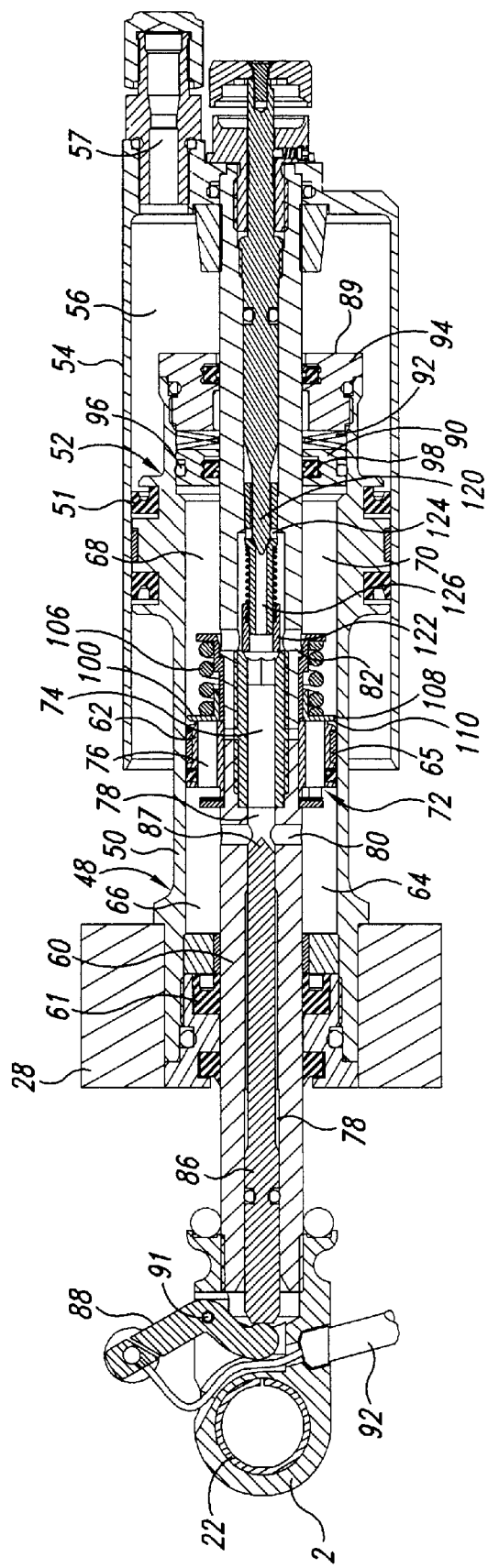
FIG. 4 is a cross-sectional view similar to FIG. 3 with the shock absorber shown in a partially compressed position with the lock-out valve in an open position and the blow-off valve in the closed position.

As best seen in FIGS. 2, 3, 4, the shock absorber 20 has a damper 48 with a damper body 50 that defines a hydraulic chamber containing a non-compressible hydraulic fluid 70, such as oil or other fluid. The damper body 50 is rigidly connected to the shock stays 28. The damper body 50 has an enlarged end portion 52 slidably disposed in an outer housing 54. The outer housing 54 forms a sealed chamber containing a pressurized compressible fluid 56, such as air or other gas. The outer housing 54 includes a conventional inlet valve 57 that allows for the air or other gas to be pumped into the chamber and selectively pressurize. Accordingly, the shock absorber 20 is an air shock. The enlarged end portion 52 of the damper body 50 has a seal 51 with an outer diameter substantially the same as the outer housing's inner diameter, so the end portion 52 sealably engages the inner surface of the outer housing 54 to prevent the air or gas from bleeding from the outer housing.

When the rear suspension system encounters a bump, the damper body 50 can slide into the outer housing 54 and compress the air. The pressurized air, however, provides a biasing force against the damper body 50, so the pressurized air will push the damper body back toward an initial uncompressed position, as shown in FIGS. 2 and 3. In alternate embodiments, other compressible members other than air or gas can be used in the outer housing 54 to provide the biasing force against the damper 48. Other embodiments can eliminate the outer housing 54 and use a biasing member, such as a coil or an elastomer spring connected to the damper 48 to bias it toward the initial uncompressed position.

As best seen in FIG. 3, the shock absorber 20 includes an elongated shaft 60 extending axially through the outer housing 54 and the damper body 50. The shaft 60 is securely connected at one end to the outer housing 54 and securely connected at its opposite end to a fitting 22 that pivotally attaches to the frame's seat tube 22. The damper body 50 is sealed against the shaft 60 with seals 61 to prevent leakage of the hydraulic fluid 70. The damper body 50 is slidable along the shaft 60 as the shock absorber 20 moves between the uncompressed and compressed positions when the mountain bike's suspension system encounters a bump.

The shaft 60 is securely connected to a piston 62 positioned within the damper body 50. The piston 62 and the shaft 60 form a piston assembly 63 in the damper body 50. The piston 62 is stationary relative to the shaft 60 so the hydraulic chamber 50 slides over the piston when the shock absorber 20 moves from the uncompressed position (FIG. 3) to the compressed position (FIG. 4). Thus, the piston 62 and the hydraulic chamber 50 move relative to each other when the seat stays 28 and the seat tube 22 move relative to each other. The piston 62 has seals 65 thereon that sealably engage the inner surface of the damper body 50 to prevent the hydraulic fluid from passing between the piston and the damper body.

The piston 62 divides the damper body's interior area 64 into two portions, so a first portion 66 and second portion 68 are on opposite sides of the piston. As the shock absorber 20 moves between the uncompressed position (FIG. 3) and the compressed position (FIG. 4), the damper body slides over the piston 62, and the hydraulic fluid 70 may selectively bypass the piston 62 through hydraulic fluid channels extending through the piston. Accordingly, the hydraulic fluid 70 may flow between the damper body's first and second portions 66 and 68. The volume and rate of flow of the hydraulic fluid 70 in the damper body 50 past the piston 62 determines the damping characteristic of the damper 48.

The hydraulic fluid channels 72 in the piston 62 include a primary bypass channel 74 extending axially through the shaft 60, and thus through the piston 62. Secondary compression flow channels 76 extend through the piston 62 and are spaced radially outward from the primary bypass channel 74. Each of the primary and secondary channels 74 and 76 are in fluid communication with the damper body's first and second portions 66 and 68, so the hydraulic fluid 70 can selectively flow therebetween. The flow of hydraulic fluid 70 through the piston, as discussed in greater detail below, is selectively restricted by a lock-out valve 86 and a blow-off valve 100. The lock-out valve 86 and the blow-off valve 100 are configured to provide adjustable and active damping when the mountain bike encounters a bump and the shock absorber's damper body 50 slides axially relative to the outer housing 54.

In the illustrated embodiment, the piston 62 is integrally connected to the shaft 60, and the primary bypass channel 74 is formed by an axial bore 78 extending 5 through the shaft. The shaft 60 has a plurality of flow ports 80 in fluid communication with the axial bore 78 and with the damper body's first portion 66. As best seen in FIG. 4, the shaft 60 also has on the opposite side of the piston 62 a plurality of flow ports 82 in fluid communication with the axial bore 78 and with the damper body's second portion 68. Accordingly, a fluid path between the damper body's first and second portions 66 and 68 is provided through the flow ports 80, 82, the axial bore 78, and the piston's primary bypass channel 74. During a compression stroke, wherein the shock absorber 20 moves toward the compressed position (FIG. 4), the hydraulic fluid 70 can move from the damper body's first portion 66 into the axial bore 78 through the flow ports 80. If the fluid flow is not fully restricted, the hydraulic fluid 70 flows through the primary bypass channel 74 and exits the axial bore 78 through the flow ports 82 on the opposite side of the piston 62 into the damper body's second portion, thereby bypassing the piston. During a rebound stroke when the lock-out valve 86 is in the open position, the hydraulic fluid 70 may flow along the rebound flow path back through the primary bypass channel 74 into the damper body's first portion 66. The main rebound flow, as discussed in greater detail below, is through rebound channels 112 in the piston and into the damper body's first portion 66.

Figure 5:
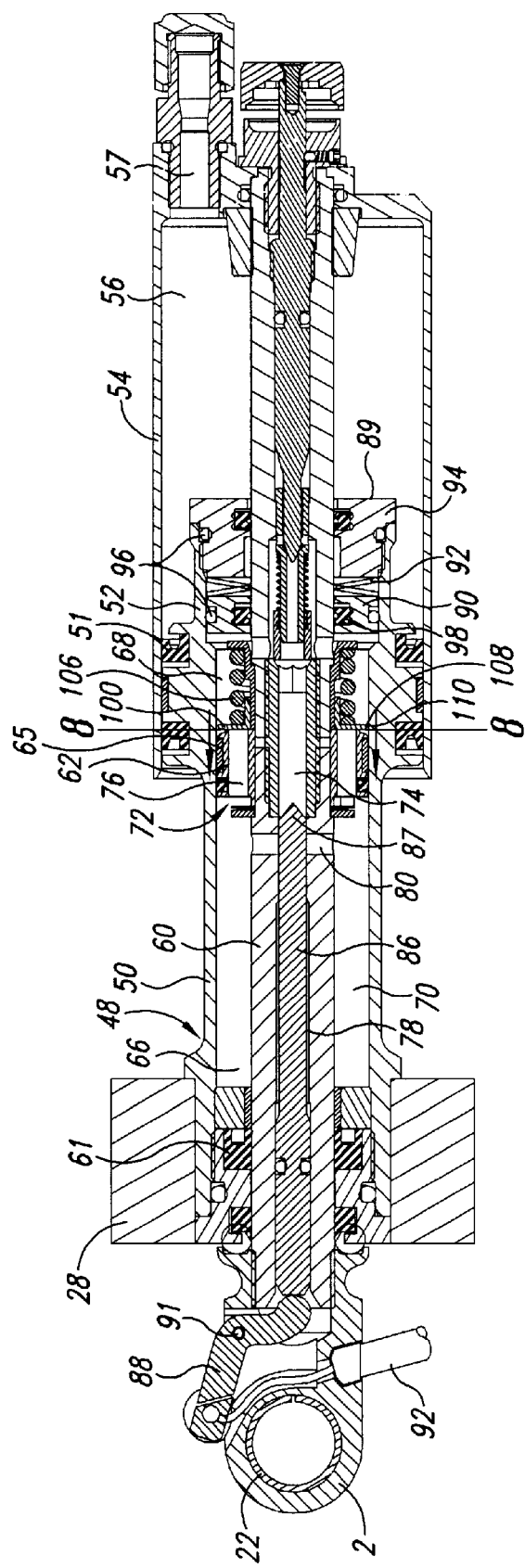
FIG. 5 is a cross-sectional view similar to FIG. 3 with the shock absorber in the uncompressed position, the lock-out valve shown in the closed position and the blow-off valve shown in the closed position.
Figure 6:
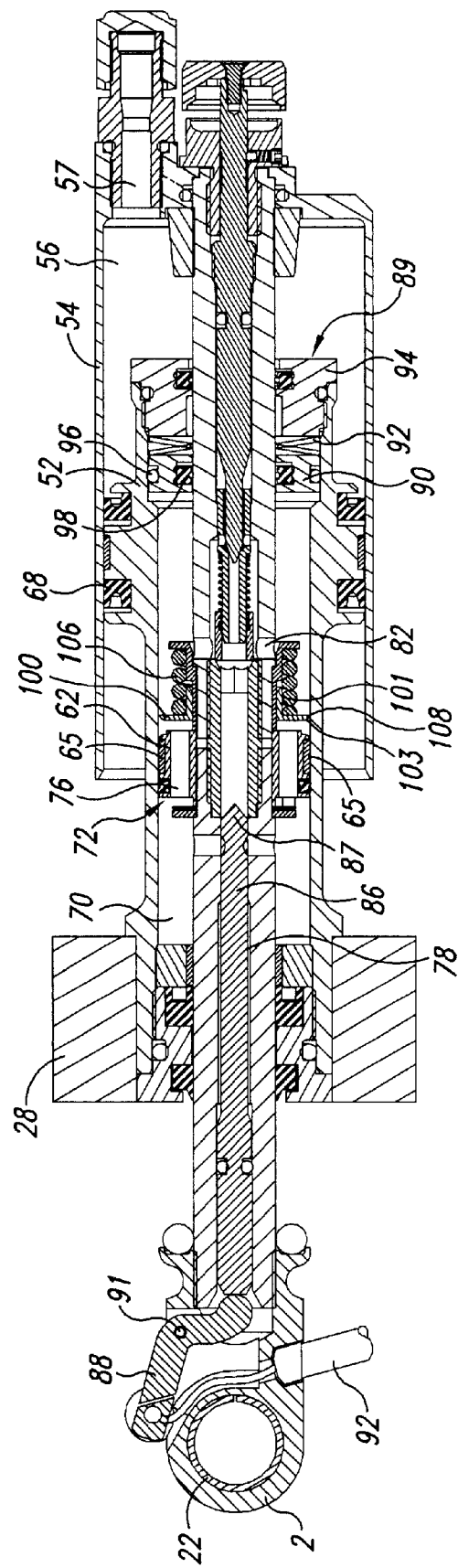
FIG. 6 is a cross-sectional view similar to FIG. 5 with the lock-out valve shown in the closed position and the blow-off valve shown in the open position.
Figure 7:
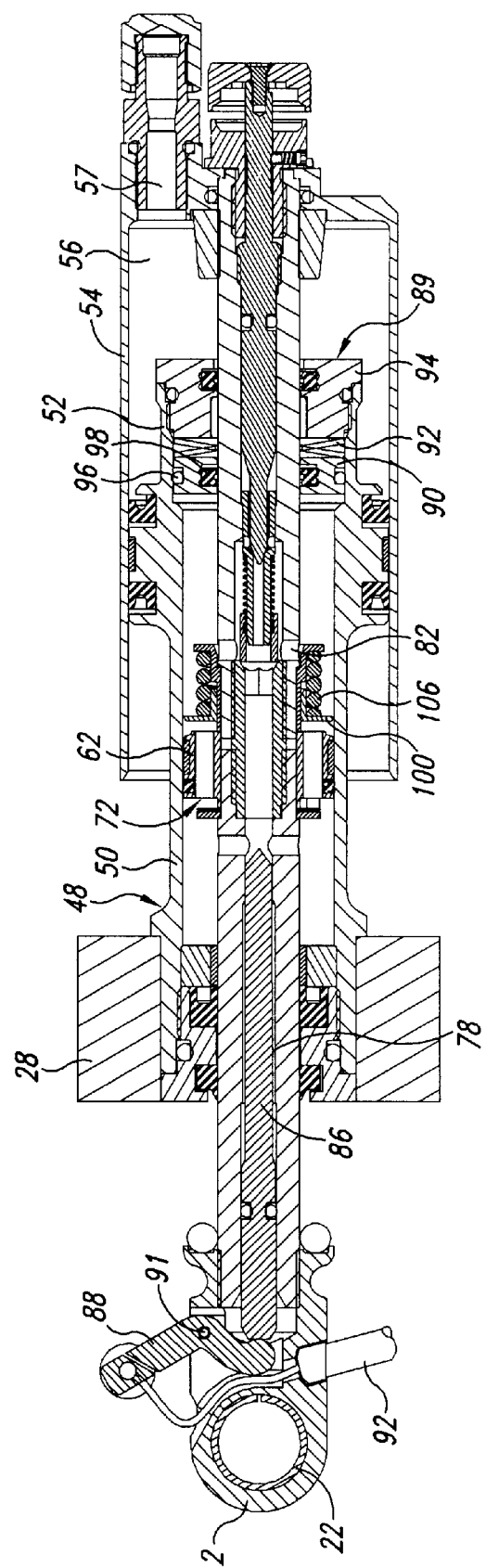
FIG. 7 is a cross-sectional view similar to FIG. 6 with the lock-out valve in the open position and the blow-off valve in the open position.

The flow of hydraulic fluid 70 through the piston 62, and thus the stiffness or suppleness of the shock absorber action, is controlled by the lock-out valve 86 and the blow-off valve 100. As best seen in FIGS. 3–5, the lock-out valve 86 of the illustrated embodiment is slidably disposed in the shaft's axial bore 78. The lock-out valve 86 is an elongated rod having a conical end 87 positioned adjacent to the flow ports 80 in the shaft 60. The lock-out valve 86 is manually moveable axially within the axial bore 78 relative to the flow ports 80 between an open position 86, shown in FIGS. 3 and 4, and a close position, shown in FIG. 5. In the open position, the conical end 87 of the lock-out valve 86 is spaced away from the flow ports 80 so as not to restrict the flow of the hydraulic fluid 70 through the flow ports to the primary bypass channel 74. In the closed position (FIG. 5), the lock-out valve 86 extends over the flow ports 80 and blocks the hydraulic fluid 70 from flowing through to the primary bypass channel 74. The lock-out valve 86 may also be moved to an intermediate position between the open and closed positions so the conical end 87 is positioned partially across the flow ports 80 to provide a restricted fluid flow through the piston's primary bypass channel 74.

In alternate embodiments, the lock-out valve 86 can be positioned in the shaft's axial bore 78 on the opposite side of the piston 62, so as to selectively block the flow of hydraulic fluid 70 through the flow ports 82 to the damper body's second portion 68. Other embodiments can have the lock-out valve 86 in other selected positions to allow for manual control of the flow of hydraulic fluid 70 past the piston 62 in the damper 48.

When the lock-out valve 86 is in the open position, the damper 48 provides decreased damping force so the shock absorber 20 has a softened characteristic to provide supple suspension action. Such supple suspension action is often times desirable during a variety conditions, such as during a down hill descent on the mountain bike when higher amplitude, lower frequency bumps may be encountered. When the lock-out valve 86 is in the closed position, the damper 48 is effectively shut off to provide decreased damping, so the shock absorber 20 has a stiffened characteristic to provide stiff suspension action. Such stiffened suspension action is desirable when encountering low amplitude, high frequency bumps, or to minimize rider-induced suspension action and increase drive line efficiency.

The lock-out valve 86 is manually moveable by the rider from the open position to the closed position by an actuator 88 attached to the fitting 62 that connects the shock absorber 20 to the seat tube 22. The actuator 88 of the illustrated embodiment is a pivoting lever that pivots about a pin 91. One end of the actuator 88 is aligned with the lock-out valve 86 and is positioned to press against the lock-out valve when in the open position. The other end of the actuator 88 is connected to the cable 92 that connects to the switch mechanism 15 on the handle bars 13 (FIG. 1), so the actuator 88 is activatable by the rider while riding by switching the switch mechanism 15 so as to pivot that actuator about the pin 91 and push the lock-out valve 86 to the closed position. In the illustrated embodiment, the switch mechanism 15 is a two position switch, so the lock-out valve 86 is either in the fully open position or is in the fully closed position. In alternate embodiments, the switch mechanism 15 has multiple positions, so the rider can feather the lock-out valve 86 between multiple intermediate positions relative to the flow ports 80 to provide a desired damping characteristic. Accordingly, the actuator 88 and the lock-out valve 86 configuration allow the rider to open and close a high volume flow area in the damper 48 as desired while riding for manual adjustment of the damping characteristics of the shock absorber 20 to accommodate different riding characteristics.

In one embodiment, the actuator 88 is biased toward a released position away from the lock-out valve 86. When the lock-out valve 86 is in the closed position and tension on the cable 92 is released, the end of the actuator 88 moves away from the lock-out valve but does not pull the lock-out valve back to the open position. In alternate embodiments, the actuator 88 can be securely fixed to the lock-out valve 86, so the actuator can be pivoted to pull the lock-out valve 86 from the closed position to the open position. Other embodiments can utilize lock-out valves 86 that are moved by an actuator activatable by a rider through means other than a pivoting lever.

In the illustrated embodiment, the hydraulic fluid 70 in the damper body 50 is maintained under a positive pressure. When the rider releases tension on the cable 92 by moving the switch mechanism and the actuator 88 returns to the released position, the pressurized hydraulic fluid 70 presses against the lock-out valve's conical surface 88 and automatically drives the lock-out valve from the closed position to the open position. Thus, the lock-out valve 86 automatically returns to the open position for supple suspension action.

As best seen in FIGS. 4 and 5, the hydraulic fluid 70 is pressurized within the damper body 50 by a compression assembly 89 attached to the enlarged end 52 of the damper body. The compression member has an end cap 94 securely connected to the damper body 50, and a floating disk 90 is positioned within the end of the damper body. The disk 90 presses directly against the hydraulic fluid 70. The disk 90 is biased against the hydraulic fluid 70 and toward the piston 62 by stiff belville springs 92 sandwiched between the disk and the end cap 94. Alternate embodiments can utilize other compression members that provide the biasing force against the disk 90 to pressurize the hydraulic fluid in the damper 48.

The compression member 89 is sealed against the shaft 60 with seals 98 so the compression member can sealably slide along the shaft as the damper 48 moves relative to the outer housing 54. The disk 90 also has a seal 96 that engages the side walls of the damper body 50 so as to sealably and slidably engage the side walls to prevent leakage of the hydraulic fluid 70. Accordingly, the disk 90 can float axially within the damper body 50 to accommodate pressure changes in the hydraulic fluid 70 during use of the shock absorber 20. When the lock-out valve is moved to the closed position, the volume available for the non-compressible hydraulic fluid in the damper is decreased. This volume change is accommodated by the compression member 89. When the lock-out valve 86 is moved to the closed position, the hydraulic fluid presses against the floating disk 90 and the belville springs 92 are compressed.

The damper 48 of the illustrated embodiment also includes the blow-off valve 100 that covers the secondary compression flow channels 76. The blow off valve 100 allows the hydraulic fluid 70 to pass through the secondary compression flow channels 76 when the hydraulic pressure in the damper 48 exceeds a selected level. As best seen in FIGS. 3–7, the blow-off valve 100 is positioned in the damper body's second portion 68 against the piston 62. The blow-off valve 100 in the illustrated embodiment is an annular ring having an L-shaped cross-section with one leg 101 extending along the shaft 60, and the other leg 103 extending over the piston 62. The blow-off valve 100 is moveable between a closed position, shown in FIGS. 3–5, and an open position, shown in FIGS. 6–7. When the blow-off valve 100 is in the closed position, the valve sealably engages the piston and covers the secondary compression flow channels 76. Accordingly, the hydraulic fluid 70 cannot flow through the piston 62 via the secondary compression flow channels 76. When the blow-off valve 100 is in the open position, the blow-off valve is spaced apart from the piston 62 and the secondary compression flow channels 76, so the hydraulic fluid 70 can flow through the piston to the damper body's second portion.

The blow-off valve 100 is biased toward the closed position by a coil spring 106. In alternate embodiments, other biasing members, such as disk springs, an elastomer, or other methods, can be used to bias the blow-off valve 100 toward the closed position. When the hydraulic pressure within the damper 48 is increased to a critical pressure to overcome the closing force from the coil spring 106, the hydraulic fluid 70 pushes the blow-off valve 100 away from the piston 62 to the open position, thereby allowing the hydraulic fluid to flow through the piston and decreasing the damping force to provide a softened shock absorber action.

When the blow-off valve 100 is in the closed position, the hydraulic fluid pressing against the valve from the piston side of the valve is only pressing on an area equal to the total cross-sectional area of the secondary compression flow channels 76. This surface area is much less than the total surface area of the blow-off valve facing the piston 62. Once the blow-off valve 100 is moved away from the piston toward the open position, the pressurized hydraulic fluid acts on the total surface area of the blow-off valve that faces the piston 62. Accordingly, the effective pressure pushing against the blow-off valve is increased as soon as the blow-off valve moves away from the closed position. This blow-off valve 100 configuration in conjunction with the coil spring 106, the compression flow channels 76, and the lock-out valve 86 provide for a suspension system that remains stiff when locked out until a large bump is hit and the blow-off valve 100 opens. This protects the shock absorber 20 from blowing it's seals when the rider hits a big bump.

In an alternate embodiment, the piston 62 does not include the secondary bypass channels 76, so the hydraulic fluid only passes through the piston during the compression stroke via the primary bypass channel 74. This configuration provides for a full lock out condition of the damper when the lock-out valve 86 is in the closed position.

Figure 9:
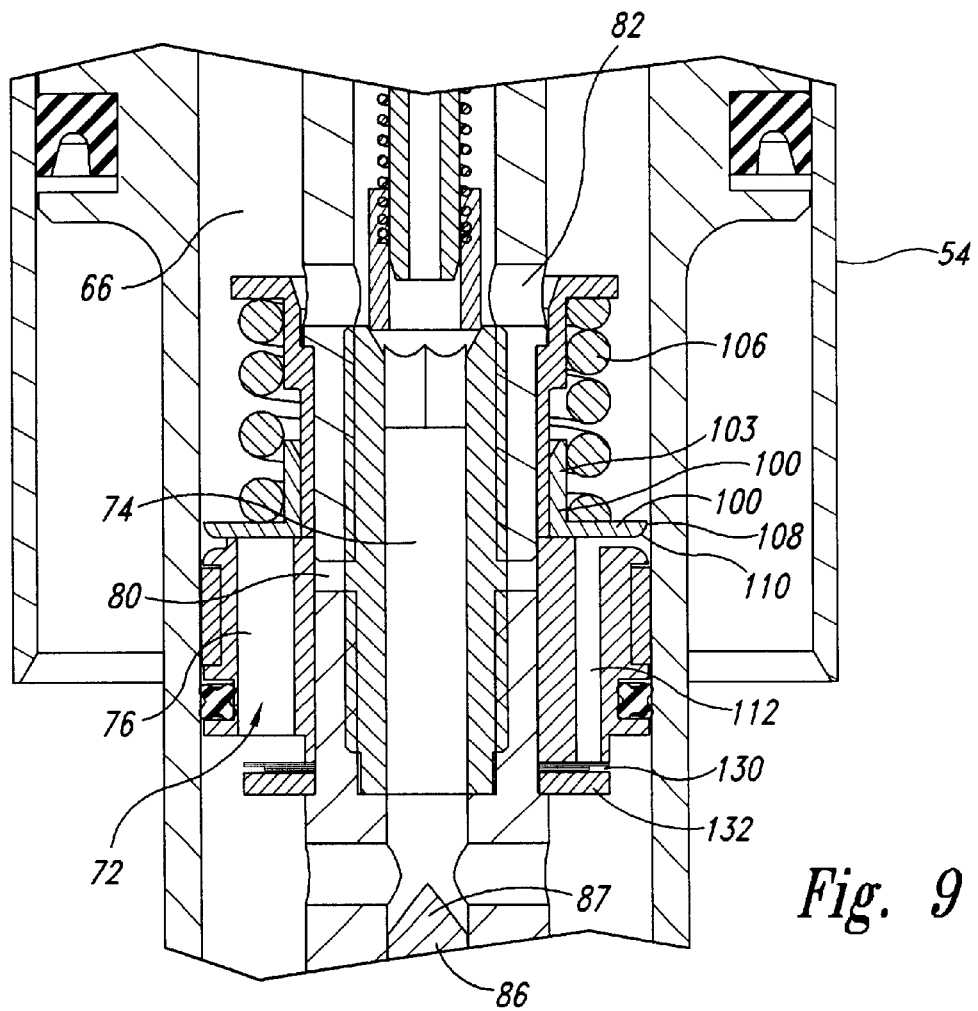
FIG. 9 is a cross-sectional view taken substantially along line 9—9 of FIG. 8 showing a rebound bypass channel and a secondary bypass channel, and with the blow-off valve shown in the closed position against the piston's surface.

The sizing of the components of the shock absorber 20, including the blow-off valve 100 and the damper body 50 is selected to allow the shock absorber to provide a dramatic range of damping force, while providing a stiff, locked mode when the shut-off valve is in the closed position, and while also allowing for ample bump absorption. As best seen in FIG. 9, the blow-off valve 100 has an outer diameter that is slightly smaller than the inner diameter of the damper body 50. Thus, a small annulus 5 or gap 108 is provided between the outer edge 110 of the blow-off valve 100 and the inside surface of the damper body 50. The outer edge 110 of the blow-off valve 100 has a curved surface that facilitates a smooth flow of the hydraulic fluid 70 from the secondary compression flow channels 76 past the blow-off valve. In the illustrated embodiment, the gap size is in the range of approximately 0.006–0.015 inches, inclusive. One embodiment has a gap size of approximately 0.0075 inches. In one exemplary embodiment, the damper body has an inside diameter of approximately 0.875 inches, and the blow-off valve has an outer diameter of approximately 0.858 inches.

The small gap 108 between the blow-off valve 100 and the inner surface of the damper body 50 is shaped and sized to allow sufficient pressure buildup under the blow-off valve 100 to hold the blow-off valve in the open position. Accordingly, the outer diameter of the blow-off valve 100 is critically sized relative to the damper body 50 to provide a configuration that uses a restricted flow area to aid the opening of the blow-off valve. The blow-off valve 100 remains in the open position while a smooth flow of the hydraulic fluid passes through the gap. After the large bump and the blow-off valve 100 is open, the pressure under the valve is slowly and smoothly released until the coil spring 106 closes the blow-off valve.

The small gap 108 allows for a smooth hydraulic pressure release to maintain a supple shock absorber motion. If the gap 108 is too large, the hydraulic pressure bleed in the damper 48 would be too dramatic and the blow-off valve 100 would open and close to quickly, thereby reducing the suppleness of the shock absorber movement. The spring force from the coil spring 106 exerted against the blow-off valve 100 is selected so as to define the critical pressure at which time the blow-off valve 100 moves to the open position. As discussed above, the hydraulic pressure acts on the small surface area of the blow-off valve 100 until the critical pressure is reached and the spring force is overcome. Then, the blow-off valve moves toward the open position and the hydraulic pressure acts on the larger surface area of the blow-off valve 100. Accordingly, the spring force is easily overcome and the blow-off valve 100 quickly moves to the open position. The hydraulic pressure acting on the larger surface also acts to hold the blow-off valve open longer until the hydraulic fluid flows through the small gap and the pressure is slowly and smoothly released, thereby providing for smooth suspension action when a large bump is hit. When enough pressure is released, the coil spring 106 returns the blow-off valve 100 to the closed position. The critical pressure as defined by the coil spring 106 or other biasing member controls lock-out mode stiffness and the open mode damping by the shock absorber 20. The small gap 108 and the resulting hydraulic pressure release characteristics also allow the shock absorber to use a stiffer spring or other biasing member that acts against the blow-off valve 100, thereby enhancing the shock-absorber's lock-out function.

Figure 8:
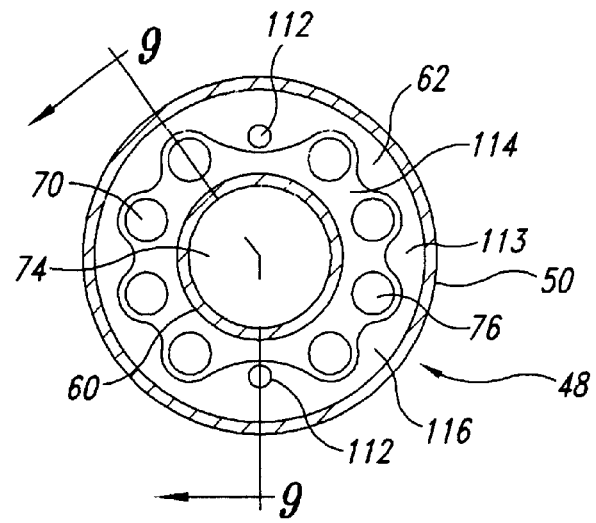
FIG. 8 is an enlarged cross-sectional view taken substantially along line 8—8 of FIG. 5 showing the surface of the piston, and primary, secondary, and rebound bypass channels extending through the piston.

As best seen in FIGS. 8 and 9, the piston 62 allows the hydraulic fluid to flow through it via the primary and secondary channels 74 and 76. The piston 62 also has a plurality of rebound channels 112 therethrough and spaced radially outward from the primary bypass channel 74. When the damper 48 moves along a rebound stroke from the compressed position toward the uncompressed position, the main flow of the hydraulic fluid 70 moves from the damper body's second portion 68 to the first portion 66 (FIG. 9) through the rebound channels 112. If the lock-out valve 86 is in the open position, the hydraulic fluid can also flow along a rebound flow path, past a rebound needle valve 120 positioned in the shaft's axial bore 78, and through the primary bypass channel 74 during the rebound stroke.

As best seen in FIG. 4, a rebound collar 122 is positioned in the shaft's axial bore adjacent to the flow ports 82. When the lock-out valve is in the open position, the rebound collar 122 directs a portion of the rebound flow toward the needle valve 120. The rebound flow passes through rebound ports 124 and into an axial passage 126 in fluid communication with the primary bypass channel 74. The rebound flow then moves through the flow ports 80 into the damper body's first portion 66. When the lock-out valve is in the closed position, no rebound flow moves past the rebound needle valve 120 and through the primary bypass channel 74. Thus, all of the rebound flow moves through the rebound channels 112. The blow-off valve 100, however, blocks the hydraulic fluid 70 from flowing through the secondary bypass channels 76.

The piston 62 has a contoured surface 113 facing the blow-off valve 100 that allows the hydraulic fluid to flow through the rebound channels 112 but not the secondary compression flow channels 76 when the blow-off valve 100 is in the closed position. The piston's contoured surface 113 includes a raised portion 114 containing the openings to the secondary bypass channels 76, and a recessed portion 116 having the openings to the rebound channels 112. Thus, when the blow-off valve 100 is in the closed position, the blow-off valve sealably engages the piston's raised portions 114 (FIG. 9), so the secondary compression flow channels 76 are completely sealed and closed. The main rebound flow of hydraulic fluid, however, can flow between the blow-off valve 100 and the piston's recessed portion 116 to the rebound ports 112 during the rebound stroke. Thus, the hydraulic fluid can flow through the piston 62 during the rebound stroke when the blow-off valve 100 and the lock-out valve 86 are in the closed position.

As best seen in FIG. 8, the surface area of the piston's raised portion 114 is substantially less than the surface area of the piston's recessed portion 116. Accordingly, the blow-off valve 100 is securely pressed against this smaller surface area of the raised portion 114. The smaller surface area of the raised portion 114 provides for an increased effective force exerted on the piston by the blow-off valve 100 and the coil spring 106. This increased effective force distributed over the smaller surface area of the piston's raised portion 114 is sufficiently high so hydraulic fluid 70 is squeezed out from between the blow-off valve 100 and the piston's raised portion 114 as the blow-off valve moves to the closed position. Accordingly, any film of the hydraulic fluid 70 between the piston and the blow-off valve 100 is minimized, thereby minimizing performance losses of the damper 48 due to leakage under the blow-off valve 100.

As best seen in FIG. 9, the side of the piston 62 opposite the blow-off valve 100 is also contoured. The surface around the secondary compression flow ports 76 is recessed. The surface around the rebound flow channels 112 is raised. A stack of thin, flexible shim disks 130 are attached to the shaft 60 adjacent to the piston and held in place by a washer 132. The stack of shim disks 130 are pressed against the raised portion of the piston and cover the rebound flow channels 112. The stack of disks are spaced apart from the secondary compression flow channels 76.

During rebound flow, the hydraulic fluid exits the rebound flow channels 112 and presses against the shim disks 130 so as to bend the shim disks. Accordingly, the rebound flow moves past the bent shim disks 130 and into the damper body's first portion. Rebound damping can be adjusted by using a stack of different shim disks with different diameters or bending characteristics. As discussed above, the rebound flow does not flow through the secondary compression flow channels 76.

During a compression stroke, the shim disks close the rebound flow channels 112 and prevent hydraulic fluid from entering the hydraulic flow channels. Accordingly, the shim disks act as a one-way rebound valve. When the blow-off valve is open, the hydraulic fluid flows from the damper body's first portion through the space between the shim disks and the secondary compression flow channels 76 and into the secondary compression flow channels, thereby flowing through the piston. Accordingly, the rebound flow and compression flow of the hydraulic fluid are controlled with the valves discussed above to provide very smooth suspension action at selected riding conditions or when manually selected by the rider to optimize the suspension characteristics as desired.

Although specific embodiments of and examples for the present invention are described herein for illustrative purposes, various equivalent modifications may be made without departing from the spirit and scope of the invention, as will be recognized by those skilled in the relevant art. The teachings provided herein of the present invention can be applied to shock absorbers and suspension systems, not necessarily limited to the illustrated suspension systems and shock absorbers described above.

These and other changes can be made to the invention in light of the above-detailed description. In general, in the following claims, the terms should not be construed to limit the invention to the specific embodiments disclosed in the specification and the claims, but should be construed to include all suspension systems and shock absorbers that operate in accordance with the claims to provide such an assembly. Accordingly, the invention is not limited by the disclosure, but instead its scope is to be determined entirely by the following claims.

What is claimed is:

1. A damper for a shock absorber, comprising:
   a chamber containing a substantially non-compressible fluid;
   a piston in the chamber dividing the chamber into first and second portions, the piston being movable relative to the chamber and sealably engaging the chamber, the piston having a channel therethrough sized to allow the non-compressible fluid to move through the piston between the and second portions of the first chamber when the piston moves relative to the chamber;
   a shaft connected to the piston, the shaft having a radial passageway therein in fluid communication with the first portion of the chamber and with the piston's channel, the shaft having an axial passageway therein in communication with the piston's channel and the second portion of the chamber;
   a first valve connected to the shaft adjacent to the chamber's first portion and being movable between closed and open positions to adjust damping characteristics of the damper, in the closed position the first valve blocks the passageway in the shaft and substantially prevents the non-compressible fluid from moving through the piston's channel to provide a stiffened damping characteristic, and in the open position the first valve allows the non-compressible fluid to move from the first portion of the chamber, through the piston's channel to the second portion of the chamber to provide a softened damping characteristic; and
   a second valve in the axial passageway of the shaft adjacent to the chamber's second portion, the second valve being adjustable to selectively allow the non-compressible fluid to flow between the axial passageway and the second portion of the chamber.

2. The damper of claim 1 wherein the valve is manually movable from the open position to the closed position.

3. The damper of claim 1 further comprising an actuator connected to the first valve and adapted to move the first valve from the open position to the closed position.

4. The damper of claim 3 wherein the actuator is movable to a released position out of engagement with the first valve, and the non-compressible fluid is under a positive pressure and moves the first valve from the closed position to the open position when the actuator is in the released position.

5. The damper of claim 1 wherein the non-compressible fluid is under positive pressure in the chamber, and the first valve is movable by the non-compressible fluid from the closed position to the open position.

6. The damper of claim 1 further comprising a biasing member coupled to the chamber and exerting a positive pressure on the non-compressible fluid.

7. The damper of claim 1 further comprising an actuator connected to the first valve and adapted to move the valve to the closed position, and selectively retain the first valve in the closed position.

8. The damper of claim 1 wherein the chamber is a first chamber, and further comprising a second chamber containing a compressible member, a portion of the first chamber is sealed against the second chamber and slidably disposed in the second chamber, the first chamber compresses the compressible member when the first chamber slides into the second chamber.

9. The damper of claim 1 wherein the compressible member is a compressible fluid.

10. A damper for a shock absorber, comprising:
    a chamber containing a substantially non-compressible fluid;
    a piston in the chamber dividing the chamber into first and second portions, the piston being movable relative to the chamber and sealably engaging the first chamber, the piston having a channel therethrough sized to allow the non-compressible fluid to move through the piston between the and second portions of the first chamber when the piston moves relative to the chamber;
    a shaft connected to the piston, the shaft having a passageway therein in fluid communication with the first portion of the chamber and with the piston's channel;
    a valve connected to the shaft adjacent to the first chamber portion and being movable between closed and open positions to adjust damping characteristics of the damper, in the closed position the valve blocks the passageway in the shaft and substantially prevents the non-compressible fluid from moving through the piston's channel to provide a stiffened damping characteristic, and in the open position the valve allows the non-compressible fluid to move from the first portion of the chamber, through the piston's channel to the second portion of the chamber to provide a softened damping characteristic, the valve is a first valve, and the piston includes an axial secondary channel therethrough between the first and second portion of the chamber, and a second valve is positioned in the chamber's second portion adjacent to the piston, the second valve being movable between closed and open positions in response to pressure exerted on the second valve by the non-compressible fluid, in the closed position the second valve blocks the secondary channel and substantially prevents the noncompressible fluid from flowing through the secondary channel to the chamber's second portion, and in the open position the second valve is spaced away from the piston and allows the non-compressible fluid to flow through the secondary channel to the second portion.

11. The damper of claim 10 further comprising a biasing member that biases the second valve to the closed position.

12. The damper of claim 10 wherein the second valve is a ring having a sealing surface that sealably engages the piston and covers the secondary channel when the second valve is in the closed position.

13. The damper of claim 10 wherein the flow regulating valve has an outer edge spaced apart a selected distance from the chamber to provide a restricted flow of the non-compressible fluid into the chamber's second portion when the second valve is in the open position.

14. The damper of claim 10 wherein the piston has a return flow channel therethrough that allows the non-compressible fluid to move from the chamber's second portion to the first portion, the piston having an end surface facing the second valve, the end surface having a raised portion and a recessed portion, the second valve in the closed position sealably engages the raised portion and is spaced apart from the recessed portion, the secondary channel has a first opening in the raised portion blocked by the second valve when in the closed position, and the return flow channel has a second opening in the recessed portion so the non-compressible fluid can flow from the chamber's second portion to the first portion when the second valve is in the closed position.

15. The damper of claim 14 wherein the surface area of the raised portion is less than the surface area of the recessed portion.

16. A damper for a shock absorber, comprising:
  a chamber containing a substantially non-compressible fluid;
  a piston in the chamber dividing the chamber into first and second portions, the piston being movable relative to the chamber;
  a channel in fluid communication with the first and second portions to allow the non-compressible fluid to move through the piston between the first and second portions of the chamber when the piston moves relative to the chamber;
  a shaft connected to the piston, the shaft having a an axial passageway therein in fluid communication with the first and second portions of the chamber and with the channel;
  a first valve connected to the channel adjacent to the chamber's first portion and being movable between closed and open positions to adjust damping characteristics of the damper, in the closed position the valve blocks the passageway and substantially prevents the non-compressible fluid from moving through the channel to provide a first damping characteristic, and in the open position the valve allows the non-compressible fluid to move from the first portion of the chamber, through the channel to the second portion of the chamber to provide a second damping characteristic; and
  a second valve in the axial passageway of the shaft adjacent to the chamber's second portion, the second valve being adjustable to selectively allow the non-compressible fluid to flow between the axial passageway and the second portion of the chamber.

17. The damper of claim 16 wherein the channel extends through an aperture extending axially through the piston.

18. The damper of claim 16, wherein the shaft has a radial passageway therein in fluid communication with the first portion of the chamber and with the channel.

19. The damper of claim 18 wherein the first valve is connected to the shaft.

20. A damper for a shock absorber, comprising:
  a chamber containing substantially non-compressible fluid;
  a piston in the chamber dividing the chamber into first and second portions, the piston sealably engaging the chamber and being movable relative to the chamber;
  an axial channel in fluid communication with the chamber's first and second portions to allow the non-compressible fluid to move through the piston between the chamber's first and second portions;
  a first valve adjacent to the chamber's first portion and being movable between open and closed positions to control movement of a flow of the non-compressible fluid through the piston; and
  a second valve adjacent to the chamber's second portion and being movable relative to the channel between closed and open positions, in the closed position the second valve substantially prevents the non-compressible fluid from flowing through the channel to the chamber's first portion, and in the open position the first valve is spaced apart from the channel and allows the non-compressible fluid to flow through the channel from the first chamber's first portion to the second portion, the second valve being configured to move from the closed position to the open position during a compression stroke in response to pressure exerted from the non-compressible fluid on the second valve.

21. The damper of claim 20 further comprising a biasing member that biases the second valve toward the closed position.

22. The damper of claim 20 wherein the second valve is a ring having a sealing surface that engages the piston and sealably covers the channel when the second valve is in the closed position.

23. The damper of claim 20 wherein the second valve has an outer edge spaced a selected distance apart from the chamber to provide a restricted flow of the non-compressible fluid between the chamber and the outer edge when the second valve is in the open position.

24. The damper of claim 20 wherein the piston has a return flow channel therethrough that allows the non-compressible fluid to move from the chamber's second portion to the first portion, the piston having an end surface with a raised portion and a recessed portion, the second valve in the closed position sealably engages the raised portion and is spaced apart from the recessed portion, the channel having a first opening in the raised portion sealably covered by the second valve when in the closed position, and the return flow channel having a second opening in the recessed portion spaced apart from the second valve when in the closed position to allow the non-compressible fluid to flow to the chamber's first portion when the second valve is in the closed position.

25. The damper of claim 24 wherein the surface area of the raised portion is less than the surface area of the recessed portion.

26. The damper of claim 20 wherein the channel is a secondary channel, and the damper further including a primary channel in fluid communication with the chamber's first and second portions, and the first valve is a lock-out valve movable relative to the primary channel between closed and open positions, the lock-out valve in the closed position substantially prevents the non-compressible fluid from passing through the primary channel, and the lock-out valve in the open position allows the non-compressible fluid to flow through the primary channel between the chamber's first and second portion further comprising an actuator connected to the lock-out valve and adapted to move the lock-out valve from the open position to the closed position.

27. The damper of claim 26 wherein the non-compressible fluid is under a positive pressure in the first chamber, and the lock-out valve is movable by the non-compressible fluid from the closed position to the open position.

28. The damper of claim 26, further comprising a biasing member coupled to the chamber that exerts a positive pressure on the non-compressible fluid.

29. The damper of claim 20 wherein the chamber is a first chamber, and further comprising a second chamber containing a compressible member, a portion of the first chamber being sealed against the second chamber and slidably disposed in the second chamber, the compressible member being compressed upon movement of the first chamber into the second chamber.

30. A suspension system for a vehicle, comprising:
first and second vehicle structures movable relative to each other; and
a shock absorber assembly connected to the first and second vehicle structures, the shock absorber assembly, comprising:
a first chamber coupled to the first vehicle structure, the first chamber containing a substantially non-compressible fluid;
a second chamber coupled to the second vehicle structure, the second chamber containing a compressible member, the first chamber being slidably disposed in the second chamber and being movable relative to the second chamber when the first vehicle structure moves relative to the second vehicle structure;
a piston assembly in the first chamber dividing the first chamber into first and second portions, the piston assembly sealably engaging the first chamber and being movable relative to the first chamber as the first and second chambers move relative to each other;
a channel in fluid communication with the chamber's first and second portions to allow the non-compressible fluid to move through the piston assembly between the chamber's first and second portions;
a first valve adjacent to the chamber's first portion and being movable between open and closed positions to control movement of a flow of the non-compressible fluid through the piston assembly; and
a second valve in the chamber's second portion and connected to the piston assembly and being movable between closed and open positions, in the closed position the valve blocks the channel and substantially prevents the non-compressible fluid from moving through the channel, and in the open position the valve allows the non-compressible fluid to move through the channel from the first portion of the first chamber to the second portion of the first chamber, the second valve being configured to move from the closed position to the open position during a compression stroke in response to pressure exerted from the non-compressible fluid on the second valve.

31. The damper of claim 30 wherein the first valve is a lock-out valve manually movable from the open position to the closed position.

32. The suspension system of claim 30 further comprising a shaft connected to the piston, the shaft having a passageway therein in fluid communication with the chamber's first portion and with the piston's channel, and the first valve is slidably disposed in the passageway.

33. The suspension system of claim 30 wherein the shaft is connected to the second vehicle structure.

34. The suspension system of claim 30 wherein the piston assembly is fixably coupled to the second vehicle structure and is stationary relative to the second chamber.

35. The suspension system of claim 30, further comprising an actuator connected to the first valve and adapted to move the first valve from the open position to the closed position.

36. The suspension system of claim 35 wherein the actuator is movable to a released position out of engagement with the first valve, and the non-compressible fluid moves the first valve to the open position.

37. The suspension system of claim 30, wherein the non-compressible fluid is under positive pressure in the first chamber, and the first valve is movable by the non-compressible fluid from the closed position to the open position.

38. The suspension system of claim 30, further comprising a biasing member coupled to the first chamber and exerting a positive pressure on the non-compressible fluid.

39. The suspension system of claim 30 wherein the channel is a secondary channel, and the piston includes a primary channel therethrough and the first valve is axially aligned with the primary channel, and the second valve is in the second chamber's portion and immediately is in the second chamber's portion and immediately adjacent to the piston, the second valve being movable between closed and open positions, in the closed position the second valve blocks the non-compressible fluid from flowing through the secondary channel from the first chamber's first portion to the second portion, and in the open position the second valve is spaced apart from the piston and allows the non-compressible fluid to flow through the secondary channel from the first chamber's first portion to the second portion during a compression stroke.

40. The suspension system of claim 39, further comprising a biasing member that biases the second valve to the closed position.

41. The suspension system of claim 39 wherein the second valve is a ring having a sealing surface that engages the piston and covers the secondary channel when the valve is in the closed position.

42. The suspension system of claim 39 wherein the second valve has an outer edge spaced a selected distance away from the first chamber to provide a restricted flow of the non-compressible fluid into the second portion of the first chamber when the second valve is in the open position.

43. The suspension system of claim 39 wherein the piston has a return flow channel therethrough that allows the non-compressible fluid to move from the first chamber's second portion to the first portion, the piston having an end surface with a raised portion and a recessed portion, the second valve in the closed position sealably engages the raised portion and is spaced apart from the recessed portion, the secondary channel having a first opening in the raised portion sealably covered by the second valve when in the closed position, and the return flow channel having a second opening in the recessed portion spaced apart from the second valve to allow the non-compressible fluid to flow to the first chamber's first portion during a rebound stroke of the piston and when the valve is in the closed position.

44. The suspension system of claim 43 wherein the surface area of the raised portion is less than the surface area of the recessed portion.

45. A suspension system for a vehicle, comprising:

first and second vehicle structures movable relative to each other; and a shock absorber assembly connected to the first and second vehicle structures, the shock absorber assembly, comprising:

a first chamber coupled to the first vehicle structure, the first chamber containing a substantially non-compressible fluid;

a second chamber coupled to the second vehicle structure, the second chamber containing a compressible member, the first chamber being slidably disposed in the second chamber and being movable relative to the second chamber when the first vehicle structure moves relative to the second vehicle structure;

a piston assembly in the first chamber dividing the first chamber into first and second portions, the piston assembly movable relative to the first chamber as the first and second chambers move relative to each other;

a channel fluid communication with the first chamber's first and second portions to allow the non-compressible fluid to move between the first and second portions of the first chamber;

a first valve in the chamber's first portion and axially aligned with the piston assembly, the first valve being positioned to control the flow of non-compressible fluid through the piston assembly;

a second valve in the chamber's second portion and axially aligned with the piston assembly, the second valve being positioned to control the flow of non-compressible fluid through the piston assembly; and a third valve adjacent to the channel, the third valve being movable between closed and open positions, in the closed position the third valve blocks the non-compressible fluid from flowing through the channel from the first chamber's first portion to the second portion, and in the open position the third valve is spaced apart from the piston and allows the non-compressible fluid to flow through the channel from the first chamber's first portion to the second portion.

46. The suspension system of claim 45 wherein the piston is fixable coupled to the second vehicle structure and is stationary relative to the second chamber.

47. The suspension system of claim 45, further comprising a biasing member coupled to the first chamber adjacent to the second portion, the biasing member exerts a positive pressure against the non-compressible fluid.

48. The suspension system of claim 45, further comprising a biasing member biasing the third valve to the closed position.

49. The suspension system of claim 45 wherein the third valve is a ring having a sealing surface that engages the piston surface and covers the channel when the third valve is in the closed position.

50. The suspension system of claim 49 wherein the sealing surface has an area greater than the cross-sectional area of the channel.

51. The suspension system of claim 45 wherein the third valve has an outer edge spaced a selected distance apart from the first chamber to provide a restricted flow of the non-compressible fluid into the second portion of the first chamber when the third valve is in the open position.

52. The suspension system of claim 45 wherein the piston has a return flow channel therethrough that allows the non-compressible fluid to move from the first chamber's second portion to the first portion, the piston having an end surface with a raised portion and a recessed portion, the third valve in the closed position sealably engages the raised portion and is spaced apart from the recessed portion, the secondary channel having a first opening in the raised portion sealably covered by the valve when in the closed position, and the return flow channel having a second opening in the recessed portion spaced apart from the third valve to allow the non-compressible fluid to flow to the first chamber's first portion when the third valve is in the closed position.

53. The suspension system of claim 52 wherein the surface area of the raised portion is less than the surface area of the recessed portion.

* * * * *

UNITED STATES PATENT AND TRADEMARK OFFICE
CERTIFICATE OF CORRECTION

PATENT NO.      : 6,382,370 B1
DATED           : May 7, 2002
INVENTOR(S)     : Robert H. Girvin It is certified that error appears in the above-identified patent and that said Letters Patent is hereby corrected as shown below:

<u>Title page, Item [54] and Column 1, line 2,</u>
Title, "VALUE" should be -- VALVE --;

<u>Column 2,</u>
Line 30, "frequency" should be -- frequency/ --;

<u>Column 3,</u>
Line 63, delete comma after "member" and insert period;

<u>Column 8,</u>
Line 21, "stiffiness" should be -- stiffness --;

<u>Column 11,</u>
Line 7, delete "5" between "annulus" and "or";

<u>Column 13,</u>
Line 53, add -- first -- before "and second";
Line 53, delete "first" before "chamber";

<u>Column 14,</u>
Line 50, add -- first -- before "and second";
Line 50, delete "first" before "chamber";

Signed and Sealed this

Seventeenth Day of June, 2003

JAMES E. ROGAN
*Director of the United States Patent and Trademark Office*